United States Patent [19]

Obayashi et al.

[11] Patent Number: 4,513,626
[45] Date of Patent: Apr. 30, 1985

[54] TORQUE DETECTOR

[75] Inventors: Hideki Obayashi, Okazaki; Tokio Kohama, Nishio; Kimitaka Saito, Okazaki; Hisasi Kawai, Toyohashi; Toshikazu Ina, Aichi, all of Japan

[73] Assignee: Nippon Soken, Inc., Nishio, Japan

[21] Appl. No.: 468,715

[22] Filed: Feb. 22, 1983

[30] Foreign Application Priority Data

| Feb. 22, 1982 | [JP] | Japan | 57-27921 |
| Mar. 26, 1982 | [JP] | Japan | 57-49324 |
| Apr. 22, 1982 | [JP] | Japan | 57-67547 |
| May 8, 1982 | [JP] | Japan | 57-77232 |

[51] Int. Cl.$^3$ .............................................. G01L 3/14
[52] U.S. Cl. .................................................. 73/862.34
[58] Field of Search ............ 73/862.32, 862.33, 862.34

[56] References Cited

U.S. PATENT DOCUMENTS

| 1,354,698 | 10/1920 | Shallcross | 73/862.33 |
| 2,147,711 | 2/1939 | Martin | 73/862.33 |
| 4,135,390 | 1/1979 | Templin | 73/862.34 |
| 4,136,559 | 1/1979 | Brown | 73/862.34 |

FOREIGN PATENT DOCUMENTS

| 0640238 | 7/1950 | United Kingdom | 73/862.33 |
| 0723407 | 3/1980 | U.S.S.R. | 73/862.33 |

Primary Examiner—Charles A. Ruehl
Attorney, Agent, or Firm—Cushman, Darby & Cushman

[57] ABSTRACT

A torque detector for detecting a torque applied to a load from a driving shaft is disclosed. The torque detector comprises an elastic member which is interposed between a first shaft connected to the driving shaft and a second shaft connected to the load so as to be connected thereto, an angular phase difference detecting means for detecting an angular phase difference occurring between the first shaft and the second shaft when the torque is transmitted from the first shaft to the second shaft through the elastic member, and a data processing means for calculating the torque from the detected angular phase difference.

11 Claims, 19 Drawing Figures

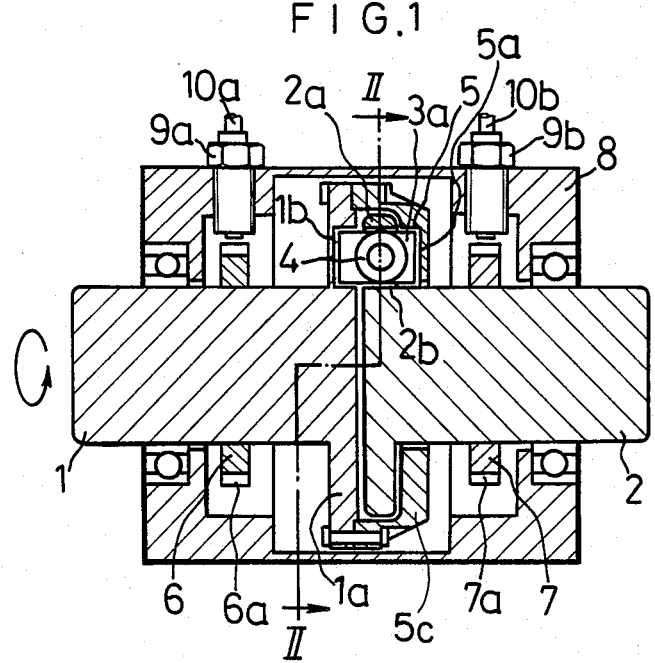
F I G. 1
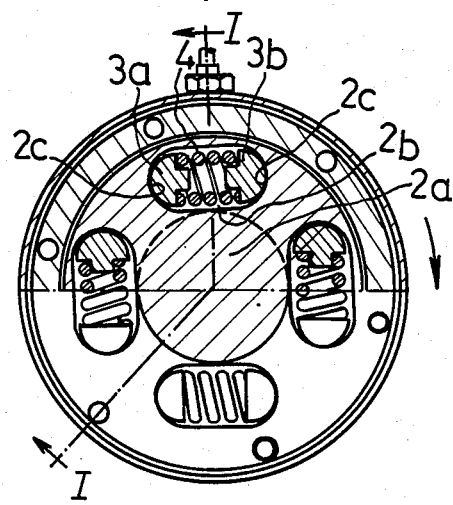
F I G. 2

F I G. 12
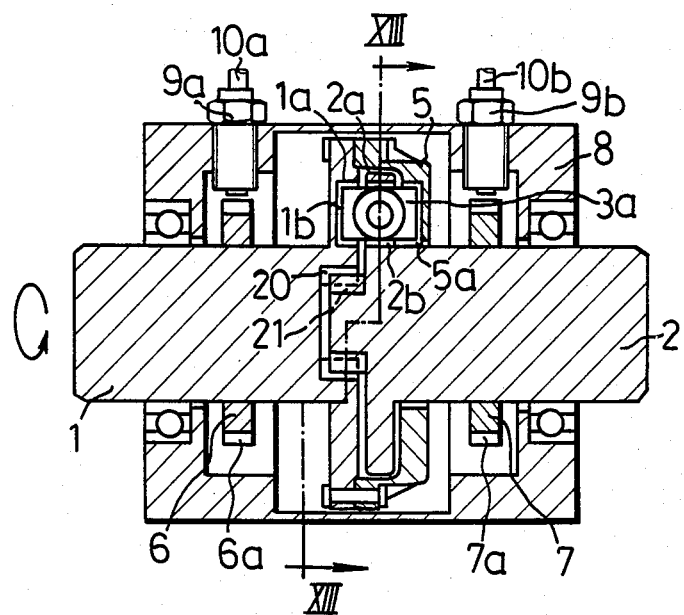
F I G. 13
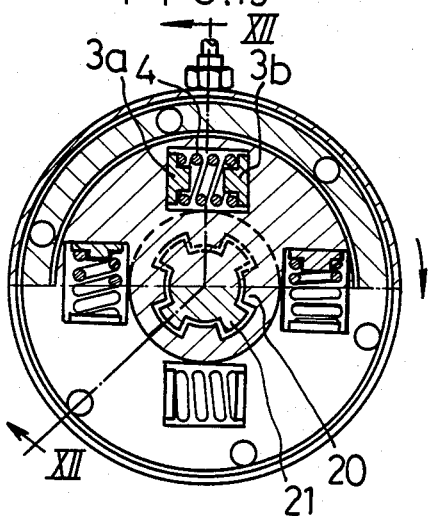

TORQUE DETECTOR

BACKGROUND OF THE INVENTION

The present invention relates to a torque detector, particularly to a torque detector for detecting a torque applied to a torque transmission shaft which is connected to a load such as a wheel of an automobile.

The conventional torque detector of this type is provided with a detector shaft of which one end is connected to a driving shaft of an engine and the other end is connected to the torque transmission shaft. In this torque detector, the torque applied to the torque transmission shaft is detected by detecting the distortion occurring in the above detector shaft.

The distortion of the above shaft is detected by a detecting means of a strain gauge type comprising a strain gauge in which electric resistance varies in proportion to the distortion, of a magnetic strain type comprising a magnetic strain pipe in which magnetic property varies in accordance with the distortion or of a phase difference type, which detects a phase difference between the distortion occurring at two separated points of the detector shaft.

However, the conventional torque detector having the above structure is large in size and complex in structure. Namely, in the conventional torque detector, the torque is detected by detecting distortion occurring in the detector shaft so that if the detector shaft is short, the accuracy of the detection is low. Therefore, in order to improve the accuracy of the detection, the detector shaft must be made long.

It has been required to control the ignition timing, the air-fuel ratio and the gear ratio of the transmission of the automobile in accordance with the torque applied to the load.

However, the above described conventional torque detector is too large and too complex in structure to be mounted on the automobile practically.

Accordingly, one object of the present invention is to provide a torque detector which is small in size and simple in structure enough to be mounted on an automobile.

Another object of the present invention is to provide a torque detector which detects torque with excellent accuracy.

SUMMARY OF THE INVENTION

The torque detector of the present invention comprises an elastic member which is interposed between a first shaft connected to a driving shaft and a second shaft connected to a load so as to be connected thereto, an angular phase difference detecting means for detecting an angular phase difference occurring between the first shaft and the second shaft when the torque is transmitted from the first shaft to the second shaft through the elastic member, and a data processing means for calculating the torque from the detected angular phase difference.

According to the torque detector of the present invention, a long detector shaft for detecting the distortion thereof need not be interposed between the first shaft and the second shaft so that the structure thereof can be made simple. Therefore, the torque detector of the present invention can be mounted on an automobile as a means for controlling an air-fuel ratio, ignition timing and gear ratio of the transmission thereof.

DESCRIPTION OF THE DRAWINGS

FIG. 1 is a longitudinal sectional view of a first embodiment of a torque detector according to the present invention;

FIG. 2 is a transverse sectional view taken along the line II—II of FIG. 1;

FIG. 12 is a longitudinal sectional view of a third embodiment of the torque detector according to the present invention;

FIG. 13 is a transverse sectional view taken along the line XIII—XIII of FIG. 12;

DETAILED DESCRIPTION OF EMBODIMENTS

Hereinafter, the present invention will be explained in accordance with several embodiments thereof with reference to the accompanying drawings.

Figure 3:
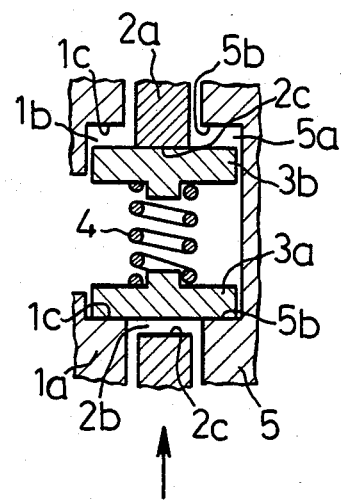
FIG. 3 is a longitudinal sectional view of an elastic member, taken along the line III—III of FIG. 2.

FIGS. 1 to 3 illustrate a first embodiment of the torque detector according to the present invention.

Shafts 1, 2 are coaxially arranged within a casing 8 so as to be opposed to each other and they are rotatably supported thereby.

One end of the shaft 1 is connected to a power source outside of the casing 8 while one end of the shaft 2 is connected to a load outside of the casing 8.

A thick walled flange 2a is formed in the other end of the shaft 2 so as to be opposed to the other end of the shaft 1. In the flange 2a, four long holes 2b extending in the circumferential direction are formed at equal angular distances.

Figure 4:
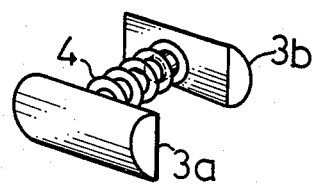
FIG. 4 is a perspective view of the elastic member and spring receiving members employed in the first embodiment.

Spring receiving members 3a, 3b having a semicircular cross section as shown in FIG. 4 and an axial length larger than the thickness of the flange 2a, are closely inserted into both ends of each of the long holes 2b so as to project on both sides of the flange 2a.

A coil spring 4 is arranged within each of the long holes 2b and both ends thereof are supported by a flat surface of each of the spring receiving members 3a, 3b. The curved surface of each of the receiving members 3a, 3b slidably contacts with the wall defining each of the end portions of the long hole 2b.

In the other end of the shaft 1, a flange 1a is formed so as to be opposed to the flange 2a of the shaft 2. And grooves 1b are formed in the flange 1a so as to be opposed to the long holes 2b formed in the flange 2a.

A coupling flange 5 is fixed to the outer periphery of the flange 1a by means of rivets so as to cover the flange 2a.

In a covering member such as flange 5, a wall portion 5c is provided in which grooves 5a are formed so as to be opposed to the grooves 1b of the flange 1a through the long holes 2b.

Both end portions of each of the receiving members 3a, 3b, which project on both sides of the flange 2a, are inserted into the grooves 5a, 1b.

To the outer periphery of the shafts 1, 2, annular plates 6, 7 are fixed, respectively. In the outer peripheral surface of each of the annular plates 6, 7, a plurality of teeth 6a, 7a are formed at equal angular distances.

Electromagnetic pickups 9a, 9b are provided in the casing 8 so as to be opposed to the teeth 6a, 7a, respectively. The pickups 9a, 9b detect the passing of the teeth 6a, 7a and generate electrical signals. The generated electrical signals are supplied to an pulse phase difference detecting circuit (described hereinafter) by way of lead wires 10a, 10b.

In operation, when the shaft 1 is rotated in the direction of the arrow in FIGS. 1 to 3, the coupling flange 5 also rotates with the shaft 1.

One end surface 1c of each of the grooves 1b formed in the flange 1a of the shaft 1 and one end surface 5b of each of the grooves 5a formed in the coupling flange 5 push the receiving members 3a as shown in FIG. 3. This pushing force is transmitted to the receiving members 3b through the coil springs 4. The receiving members 3b push the flange 2a of the shaft 2 to rotate the shaft 2 in the same direction as the rotating direction of the shaft 1.

When the load of the shaft 2 is small, the deforming amount of each spring 14 is small and as the load of the shaft 2 increases, the deforming amount of each spring 4 increases in proportion thereto.

Due to this deformation of the coil springs 4, a phase difference occurs between the shaft 1 and the shaft 2. This phase difference varies in proportion to the amount of deformation of the spring 4, that is, in turn, proportional to the torque applied to the load side.

This phase difference is detected by the electromagnetic pickups 9a, 9b which are opposed to the teeth 6a, 7a formed in the annular members 6, 7.

Figure 5:
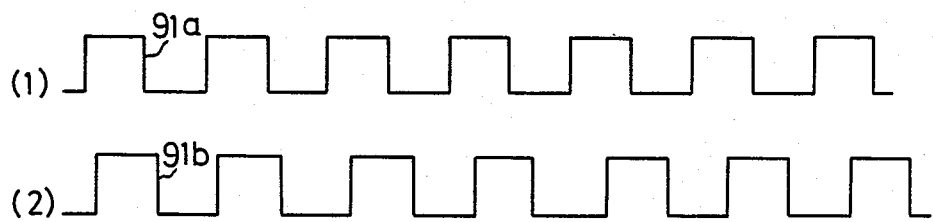
FIG. 5 is a wave form diagram of output signals.

FIG. 5 is a wave form diagram of output signals detected by the pickups 9a, 9b.

FIG. 5(1) shows a pulse wave form of the output signal detected by the pickup 9a and FIG. 5(2) shows a pulse wave form of the output signal detected by the pickup 9b.

Figure 6:
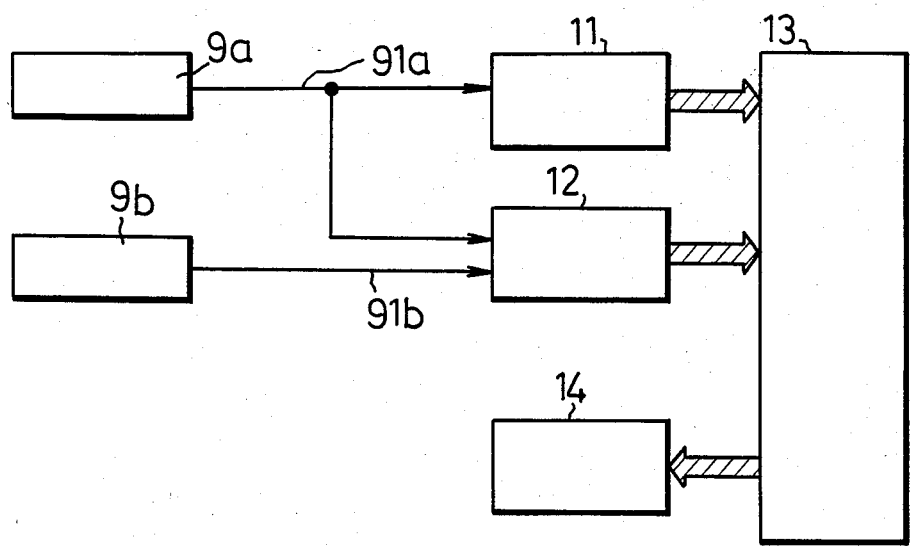
FIG. 6 is a block diagram of an angular phase difference detecting means and a data processing circuit employed in the first embodiment.

FIG. 6 is a block diagram of the angular phase difference detecting means and the data processing means of the present invention.

A rotating speed counting circuit 11 is electrically connected to the electromagnetic pickup 9a and a phase difference detecting circuit 12 is electrically connected to the electromagnetic pickups 9a l and 9b.

The rotating speed counting circuit 11 and the phase difference detecting circuit 12 are electrically connected to a microcomputer 13 as the data processing circuit, respectively. And the data processing circuit 13 is electrically connected to an indicating circuit 14.

In operation, the output signal 91a detected by the pickup 9a is fed to the rotating speed counting circuit 11 while the output signals 91a, 91b detected by the pickups 9a, 9b are fed to the phase difference detecting circuit 12.

The rotating speed counting circuit 11 feeds digital data T1 which is proportional to the period of the output signal 91a and is inversely proportional to the rotating speed N, to the data processing circuit 13.

The phase difference circuit 12 feeds digital data P which is proportional to the phase difference between the output signals 91a, 91b, to the data processing circuit 13.

The data processing circuit 13 calculates the torque from the digital data $T_1$ and P and the obtained torque is indicated by the display circuit 14.

Figure 7:
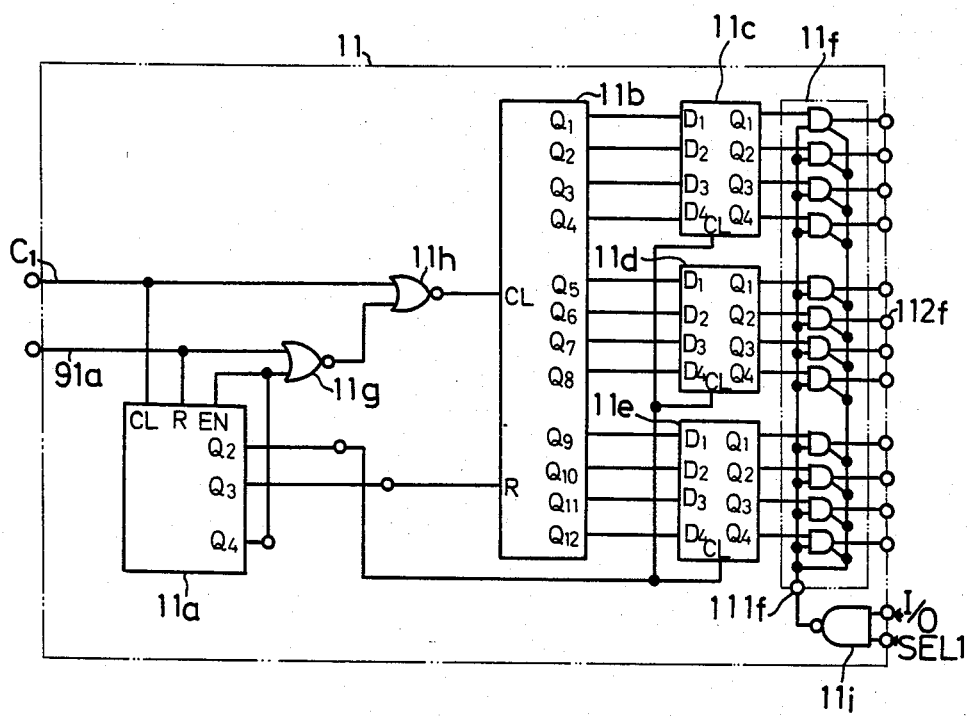
FIG. 7 is a circuit diagram of a rotating speed counting circuit composing the angular phase difference detecting means.

FIG. 7 is a circuit diagram of the rotating speed counting circuit 11.

The reference numerals 11a, 11b designate counters, 11c, 11d, 11e designate shift registers and 11f designates a three-state buffer.

The counter 11a comprises a clock terminal CL, a reset terminal R, a counter enable terminal EN, and output terminals $Q_2$ to $Q_4$. The output terminal $Q_4$ is connected to the counter enable terminal EN.

To the clock terminal CL, a clock pulse signal $C_1$ is applied and the counter 11a counts the clock pulse signal $C_1$. When the output signal from the output terminals $Q_4$ is "1" level, the "1" level signal is fed to the counter enable terminal EN to stop the counting operation of the counter 11a.

Figure 8:
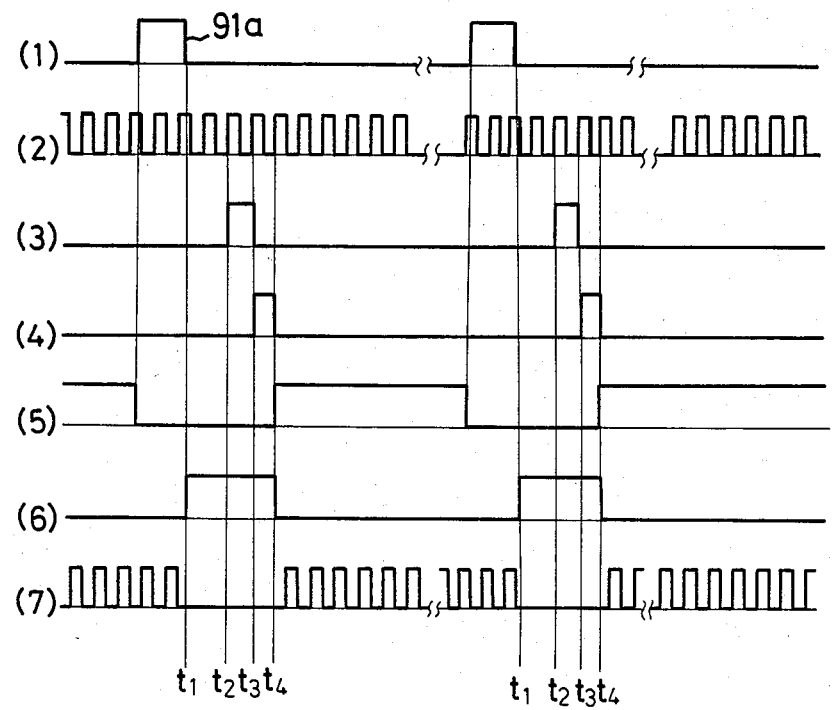
FIG. 8 is a wave form diagram showing the operation timing of the rotating speed counting circuit.

When the signal 91a shown in FIG. 8(1) is fed to the reset terminal R, the counter 11a is reset so that the output signal from the output terminal $Q_4$ is changed into "0" level as shown in FIG. 8(5).

When the signal 91a is changed into "0" level, the counter 11a starts the counting operation to generate the pulse signals shown in FIGS. 8(3), 8(4) from the output terminals $Q_2$, $Q_3$ in order.

When the output signal from the output terminal $Q_4$ is turned into "1" level, the counter 11a stops the counting operation, again.

The counter 11b comprises a clock terminal CL, a reset terminal R and output terminals $Q_1$ to $Q_{12}$ which are electrically connected to input terminals $D_1$ to $D_4$ of each of shift registers 11c, 11d, 11e, respectively.

The output signal from the output terminal $Q_4$ of the counter 11a and the signal 91a are fed to a NOR gate 11g and the NOR gate 11g feeds a pulse signal shown in FIG. 8(6) to a NOR gate 11h.

The clock pulse signal $C_1$ shown in FIG. 8(2) is also fed to the NOR gate 11h. The NOR gate 11h feeds a pulse signal shown in FIG. 8(7) to the clock terminal CL of the counter 11b.

The output signal from the output terminal Q₃ of the counter 11a is fed to the reset terminal R of the counter 11b.

The output signal from the output terminal Q₂ of the counter 11a is fed to a clock terminal CL of each of the shift registers 11c, 11d, 11e.

The counter 11b stops the counting operation at the time t₁ when the signal 91a shown in FIG. 8(1) is changed into "0" level and the output signal from the NOR gate 11g shown in FIG. 8(6) is changed into "1" level.

Thereafter, the output signal from the output terminals Q₁ to Q₁₂ of the counter 11b are temporally memorized by the shift registers 11c to 11e at the time t₂ when the output signal from the output terminal Q₂ of the counter 11a is changed into "1" level.

Next, at the time t₃ when the output signal from the output terminal Q₃ of the counter 11a is changed into "1" level, the counter 11b is reset and at the time t₄ when the output signal from the output terminal Q₄ of the counter 11a is changed into "1" level, the counter 11b starts the counting operation, again.

The counter 11b continuously feeds output signals (counted data) to the shift registers 11c, 11d, 11e so as to synchronize with the output signal 91a from the pickup 9a. Each of the shift registers 11c to 11e feeds digital data T₁ which is proportional to the pulse period of the output signal 91a, namely the reciprocal of rotating speed (1/N) of the shaft 1, from the output terminals Q₁ to Q₄ to a three state buffer 11f.

The control terminal 111f of the three state buffer 11f is connected to a NAND gate 11i.

To the NAND gate 11i, an input and output control signal (hereinafter will be called I/O signal) and a device select signal (SEL 1) are applied from a device control unit (DCU) of the microcomputer 13.

When the output signal of the NAND gate 11i is changed into "0" level, digital data T₁ which is proportional to the reciprocal of rotating speed is fed from the output terminals 112f to the microcomputer 13.

In this circuit, a well known quartz clock of about 524KH₃ is used to feed a clock pulse signal.

Figure 9:
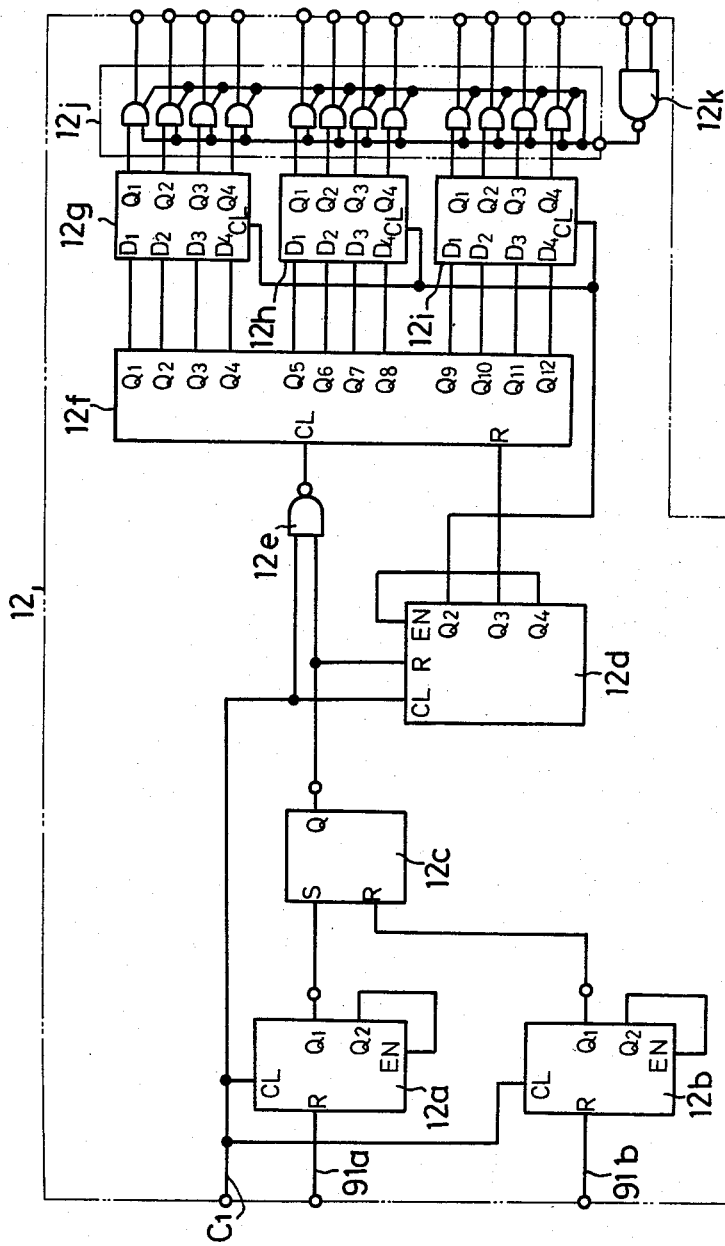
FIG. 9 is a circuit diagram of a phase difference detecting circuit composing the angular phase difference detecting means.

FIG. 9 is a circuit diagram of the phase difference detecting circuit 12.

The reference numerals 12a, 12b, 12d, 12f designate counters, 12c designates a R-S flipflop, 12g, 12h, 12designate shift registers and 12j designates a three-state buffer.

Figure 10:
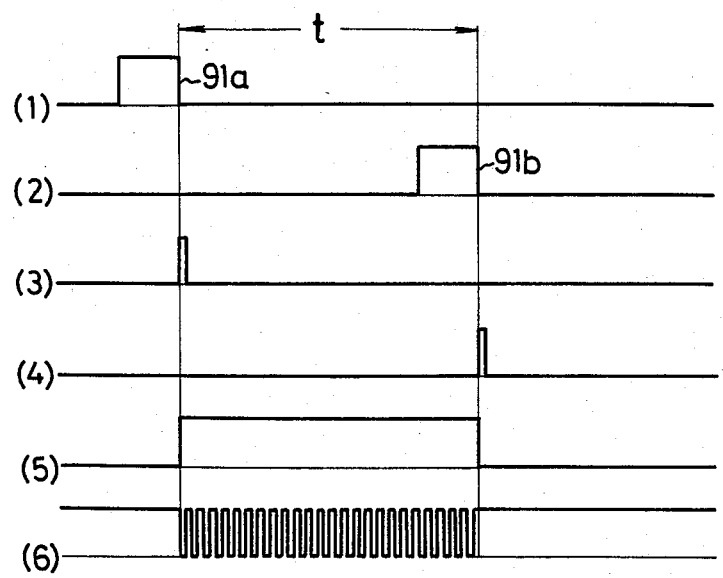
FIG. 10 is a wave form diagram showing the operation timing of the phase difference detecting circuit.

The signals 91a, 91b shown in FIGS. 10(1), (2) are fed to the reset terminals R of the counters 12a, 12b, respectively. The counters 12a, 12b feed pulse signals shown in FIGS. 10(3) 10(4) from the output terminals Q₁ thereof to the S terminal and the R terminal of the R-S flipflop 12c, respectively.

The R-S flipflop 12c feeds a pulse signal shown in FIG. 10(5), of which "1" level is kept for a time t corresponding to the phase difference between the signals 91a, 91b, from the output terminal Q to the NAND gate 12e.

While the pulse signal from the R-S flipflop 12c is "1" level, the NAND gate opens to feed a clock pulse signal C₁ shown in FIG. 10(6) to the clock terminal CL of the counter 12f.

Next, the shift registers 12g to 12i, the three-state buffer 12j and a NAND gate 12k operate in the same manner as explained on the operation of the rotating speed counting circuit 11 to feed digital data P which is proportional to the time t corresponding to the phase difference between the output signals 91a, 91b, to the microcomputer 13.

The microcomputer 13 memorizes the digital data T₁ which is applied from the rotating speed counting circuit 11 and the digital data P which is applied from the phase difference detecting circuit 12 in an inside memory (RAM) every period determined by the program thereof. Then, the microcomputer 13 calculates the torque from the memorized data.

The microcomputer 13 need not operate so as to be synchronous with the rotating speed counting circuit 11 and the phase difference detecting circuit 12 since each of the circuits 11, 12 is provided with a latch circuit.

In order to improve the accuracy, the microcomputer 13 should be operated so as to receive input signals when the circuits 11, 12 receive input signals.

According to the present invention, any device can be used as a display circuit 14. For example, 7 segment LED is used as a digital display circuit and D/A converter is used as an analogue display circuit.

In operation, when the load torque is applied, the spring 4 is compressed in accordance therewith so that the phase of the signal 91b delays from that of the signal 91a.

The shaft torque T is expressed by the following equation:

$$T = K_1 \cdot N \cdot P = K_2(1/T_1) \cdot P$$

wherein K₁, K₂ are constant, N is a rotating speed, P is a digital data fed from the phase difference detecting circuit 12 and T₁ is digital data fed from the rotating speed counting circuit 11.

The value N·P is proportional to the angular phase difference of the shafts 1, 2.

From the above equation, the shaft torque T can be calculated from the data T₁ and P by the microcomputer 13. The calculated value of the shaft torque T is indicated by the display circuit 14.

Figure 11:
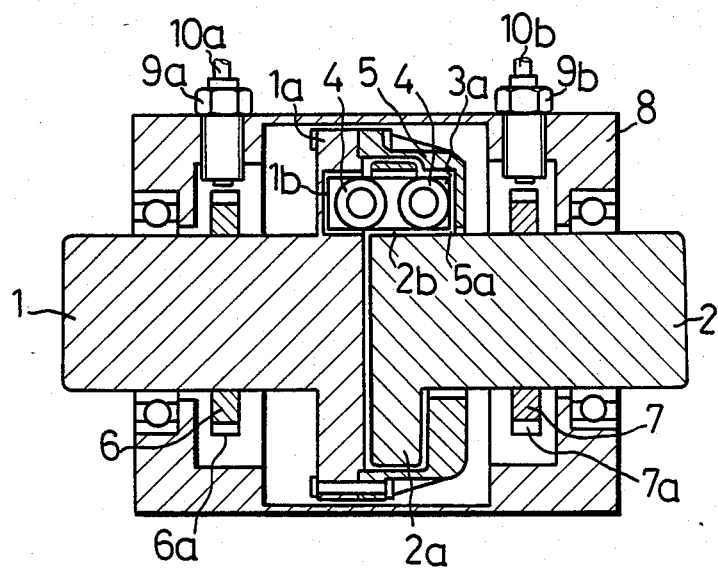
FIG. 11 is a longitudinal sectional view of a second embodiment of the torque detector according to the present invention.

FIG. 11 illustrates a second embodiment of the torque detector according to the present invention. In the second embodiment, two springs 4 are arranged in the axial direction of the driven shaft 1 and the torque transmission shaft 2 within each of the long holes 2b. The other structure of the second embodiment is substantially equal to that of the first embodiment.

The torque detector of the second embodiment is suitable to a detector which is used for detecting a large torque.

FIGS. 12 and 13 illustrate a third embodiment of the torque detector according to the present invention.

In the end surface of the shaft 1, which is opposed to that of the shaft 2, inner teeth 20 are formed and in the end surface of the shaft 2, outer teeth 21 are formed so as to mesh with the inner teeth 20 at a predetermined distance.

The other structure of the third embodiment is substantially equal to that of the first embodiment.

In operation, when the applied torque becomes remarkably large at an engine starting time or engine stopping time, the inner teeth 20 and the outer teeth 21 strike against each other to stop the spring 4 from being compressed further.

Therefore, the spring 4 is prevented from being excessively compressed so that the spring constant of the spring 4 does not change and damage to the spring 4 is prevented. As a result, the torque detecting accuracy will always be high.

Figure 14:
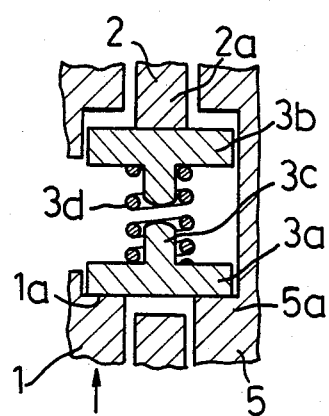
FIG. 14 is a longitudinal sectional view of an elastic member employed in a fourth embodiment of the torque detector according to the present invention.
Figure 15:
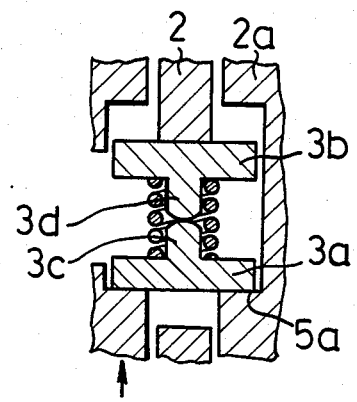
FIG. 15 is a longitudinal sectional view of an elastic member of the fourth embodiment under operation.

FIGS. 14 and 15 illustrate a fourth embodiment of the torque detector according to the present invention.

In the fourth embodiment, from the spring receiving members 3a, 3b project projecting portions 3c, 3d so as to be opposed to each other at a predetermined distance.

In operation, when the compressing value of the spring 4 reaches a predetermined maximum value, the opposed ends of the projecting portions 3c, 3d abut on each other to prevent the spring 4 from being compressed further.

In the preceding embodiments, coil springs are used to connect the driving shaft to the torque transmission shaft. Instead, rubber members, torsion springs or elastic resins can also be used.

The angular phase of each of the shafts 1 and 2 can be detected electromagnetically or photoelectrically. For example, an oscillator or a semiconductor could be employed.

Figure 16:
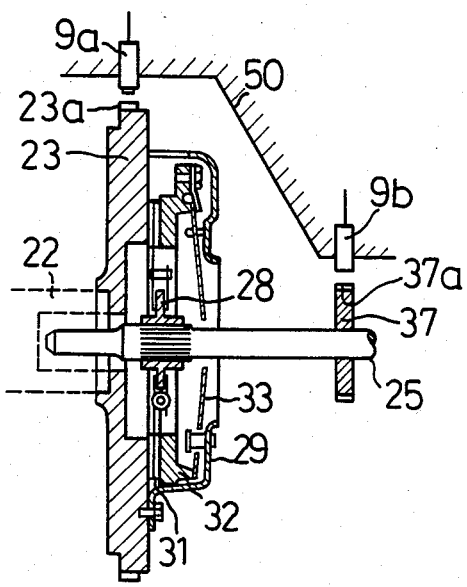
FIG. 16 is a longitudinal sectional view of a fifth embodiment of the torque detector according to the present invention.
Figure 17:
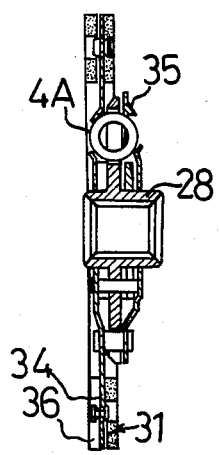
FIG. 17 is a sectional view of a clutch disc employed in the fifth embodiment.
Figure 18:
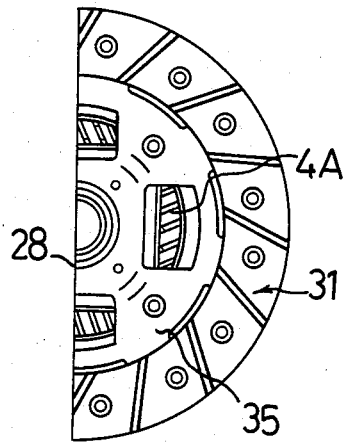
FIG. 18 is a plan view of a half of the clutch disc of FIG. 17.

FIGS. 16 to 18 illustrate a fifth embodiment of the torque detector according to the present invention. In the fifth embodiment, the torque detector is provided in the transmission of an internal combustion engine.

A flywheel 23 is connected to an engine crank shaft 22 so as to rotate therewith.

One end of an input shaft 25 of the transmission is connected to a hub 28 of a clutch disc 31 by a spline while the other end thereof is supported by a supporting member (not shown) through a bearing (not shown).

Within a clutch cover 29 which is connected to the flywheel 23, the clutch disc 31, a pressure plate 32, and a diaphragm spring 33 are provided.

The rotating driving force of the flywheel 23 is transmitted to the shaft 25 through the clutch disc 31 when the clutch disc 31 is pressed to the flywheel 23 due to the displacement of a release bearing (not shown) through the diaphragm spring 33 and the pressure plate 32.

FIGS. 17 and 18 illustrate the structure of the clutch disc 31. The clutch disc 31 comprises the hub 28 connected to the shaft 25 by a spline, a disc plate 34 supported by the hub 28, torsion springs 4A interposed between the hub 28 and the disc plate 34, a sub plate 35 and a facing 36.

The torsion springs 4A absorb the torque changes occurring during the rotation of the engine and also reduce the noise of the driving device.

Coil springs or rubber members can be substituted for the torsion springs 4A.

In operation, when the clutch is connected, the torque is transmitted to the load side so that the torsion springs 4A are compressed in accordance with the load torque. The compressing value of the torsion springs 4A corresponds to the angular phase difference between the flywheel 23 and the shaft 25.

In the outer peripheral surface of the flywheel 23, teeth 23a are formed at equal angular distances. To the outer peripheral surface of the shaft 25, an annular plate 37 provided with teeth 37a in the outer peripheral surface thereof at equal angular distances, is integrally fixed.

Electromagnetic pickups 9a, 9b are provided in the housing 50 so as to be opposed to the teeth 23a, 37a, respectively.

The pickups 9a, 9b detect the angular phase of the flywheel 23 and the shaft 25, respectively. Then the torque is calculated from the difference between the detected angular phases by the processing circuit shown in the first embodiment.

Figure 19:
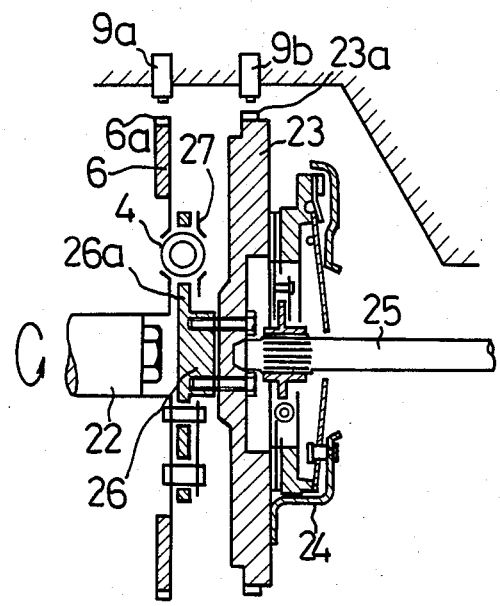
FIG. 19 is a longitudinal sectional view of a sixth embodiment of the torque detector according to the present invention.

FIG. 19 illustrates a sixth embodiment of the torque detector according to the present invention. The crank shaft 22 and the flywheel 23 are connected to or cut out from the input shaft 25 of the transmission (not shown) by means of the clutch means 24 having the same structure as that of the fifth embodiment.

A shaft 26 is interposed between the crank shaft 22 and the input shaft 25 and one end of the shaft 26 is fixed to the input shaft 25.

An annular plate 6 is integrally fixed to the shaft 22 so as to be opposed to a flange 26a formed in the other end of the shaft 22.

In the flange 26a, a plurality of long holes are formed and springs 4 are accomodated therein. The springs 4 are supported by receiving members (not shown) which are engaged with a subplate 27 covering the outer periphery of the flange 26a and fixed to the annular plate 6.

In the outer periphery of the annular plate 6, teeth 6a are formed while in the outer periphery of the flywheel 23, teeth 23a are formed.

Electromagnetic pickups 9a, 9b are provided so as to be opposed to the teeth 6a, 23a, respectively.

In operation, when the shaft 22 is rotated, the rotation thereof is transmitted to the input shaft 25 through the annular plate 6, the flywheel 23, and the clutch means 24.

The angular phase of the annular plate 6 and the flywheel 23 are detected by the pickups 9a, 9b, respectively. The torque is calculated from the difference between the detected angular phase by the processing circuit described in detail in the first embodiment.

As described above, the torque detector of the present invention is characterized in that torque is detected by interposing an elastic member between a shaft on a driving side and a shaft on a load side, and by detecting the angular phase difference between both shafts due to the deformation of the elastic member which occurs when the rotating force on the shaft on the driving side is transmitted to the shaft on the load side through the elastic member.

The torque detector of the present invention having the above described structure can be made remarkably small as compared with a conventional detector which provides a separate shaft mounted coaxially between the above two shafts and measures the distortion occurring in the separate shaft.

Therefore, the torque detector of the present invention can be mounted on a vehicle.

The detected torque can be used for controlling the ignition timing and the air-fuel ratio of an engine and the gear ratio of a transmission.

What is claimed is:

1. A torque detector comprising:
    (1) a first shaft adapted for integral connection with a driving shaft of an internal combustion engine so as to be rotated therewith;
    (2) a second shaft adapted for connection to a load, which is arranged so as to be coaxially opposed to said first shaft, opposing ends of each of said shafts being provided with a flange so as to be opposed to each other, said flange of one of said shafts being provided with a plurality of long holes, each of which penetrates said flange and extends in the direction of rotation of said shafts along the periphery of said flange;

(3) a plurality of elastic members, said elastic members being accomodated within said long holes;

(4) elastic member receiving means for receiving both ends of each of said elastic members which are supported by the walls defining both ends of each of said long holes and projecting on both sides of said flange of said one shaft;

(5) a covering member which is integrally formed with said flange of the other one of said shafts so as to cover the peripheral portion of said flange of said one shaft, said covering member being provided with a wall portion which is opposed to said flange of said other shaft through said flange of said one shaft, a plurality of long grooves being formed in said flange of said other shaft and in said wall portion of said covering member so as to be opposed to each other through said long holes formed in said flange of said one shaft, both projecting ends of each of said receiving means projecting into said opposed long grooves formed in said flange of said other shaft and said covering member;

(6) angular phase difference detecting means for detecting the angular phase difference between said first and second shafts during the rotation thereof;

(7) data processing means for calculating torque from the angular phase difference; and (8) display means for indicating the calculated torque.

2. A torque detector according to claim 1, wherein: within each of said long holes, two elastic members are arranged adjacently in the axial direction of said shafts.

3. A torque detector according to claim 1, further comprising:
a stopping means for restricting the angular phase difference between said two shafts within a predetermined limit.

4. A torque detector according to claim 3, wherein: said stopping means comprises a concave portion formed in the end surface of said one shaft and a convex portion formed in the opposed end surface of said other shaft; and
said convex portion is inserted within said concave portion so as to be rotatable with respect to said concave portion within said predetermined limit.

5. A torque detector according to claim 3, wherein: said stopping means comprises projecting portions which are formed in said receiving means so as to project toward each other; and
projecting ends of said projecting portions are opposed to each other at a distance corresponding to said predetermined limit.

6. A torque detector according to claim 1, wherein: each one of said plurality of elastic members is formed of a member selected from the group consisting of springs, rubber blocks and elastic resin blocks.

7. A torque detector according to claim 1, wherein: said angular phase difference detecting means comprises:
a pulse generating means for generating a pulse every predetermined rotating angle of each of said first and second shafts;
a pulse phase difference detecting circuit for generating digital data corresponding to the difference between the generated pulses; and
a converting circuit for converting said digital data into digital data corresponding to the angular phase difference.

8. A torque detector according to claim 7, wherein: said pulse generating means is composed of two annular members which rotate with said first and second shafts, respectively;
each of said annular members being provided with a plurality of teeth in the outer periphery thereof at predetermined angles; and
two electromagnetic pickups which are provided so as to be opposed to said teeth of said annular members, respectively.

9. A torque detector according to claim 7, wherein: said converting circuit is composed of
a rotating speed counting circuit for generating digital data in proportion to the pulse period of said pulse generated by said pulse generating means; and
a processing circuit for calculating the angular phase difference from said digital data generated by said pulse phase difference detecting circuit and that generated by said rotating speed counting circuit.

10. A torque detector according to claim 1, wherein: said first shaft is an engine crank shaft, and said second shaft is a shaft integrally connected to a flywheel.

11. A torque detector according to claim 1, wherein: said first shaft is a flywheel connected to an engine crank shaft so as to rotate therewith, said flange of said first shaft is a clutch disc engageable with said flywheel, said second shaft is a hub joined to a load shaft which is connected to a load, and said flange of said second shaft is integrally formed around said hub.

* * * * *